United States Patent [19]

Povey

[11] Patent Number: 5,557,848
[45] Date of Patent: Sep. 24, 1996

[54] ROTARY ATOMISERS

[75] Inventor: Graham S. Povey, Bromyard, United Kingdom

[73] Assignee: Micron Sprayers Limited, Bromyard, United Kingdom

[21] Appl. No.: 256,705

[22] PCT Filed: Jan. 12, 1993

[86] PCT No.: PCT/GB93/00053

§ 371 Date: Jul. 21, 1994

§ 102(e) Date: Jul. 21, 1994

[87] PCT Pub. No.: WO93/13867

PCT Pub. Date: Jul. 22, 1993

[30] Foreign Application Priority Data

Jan. 21, 1992 [GB] United Kingdom ............. 9201190

[51] Int. Cl.[6] .................................................. B05B 3/10
[52] U.S. Cl. ............................. 29/890.143; 29/527.6; 29/465
[58] Field of Search ........................... 29/527.6, 527.1, 29/890.142, 465, 890.143

[56] References Cited

U.S. PATENT DOCUMENTS

| | | | |
|---|---|---|---|
| 2,220,275 | 11/1940 | Preston | 299/63 |
| 3,250,473 | 5/1966 | Hege | 239/7 |
| 3,305,918 | 2/1967 | Christen et al. | 29/527.6 |
| 3,692,429 | 9/1972 | Redding | 416/201 |
| 3,802,063 | 4/1974 | O'Connor | 29/527.6 |
| 3,927,600 | 12/1975 | Peisker | 90/11 C |
| 4,221,332 | 9/1980 | Bals | 239/223 |
| 4,225,084 | 9/1980 | Bals | 239/223 |
| 4,346,849 | 8/1982 | Rood | 239/597 |
| 4,502,634 | 3/1985 | Bals | 239/223 |
| 4,579,286 | 4/1986 | Stoudt | 239/568 |

OTHER PUBLICATIONS

Soviet Patents Abstracts, Week 8908, Derwent Publications Ltd., London, GB; & SU 1 416 197.
Handbuch der Fertingungstechnik, Band 1, Munchen, Wien 1981, p. 599, chapter 2.6.1.5, lines 1–4.
Injection Molding Handbook, 2nd ed., New York, 1995, p. 322, left column, lines 21–28.

Primary Examiner—Larry I. Schwartz
Assistant Examiner—Marc W. Butler
Attorney, Agent, or Firm—Jacobson, Price, Holman & Stern, PLLC

[57] ABSTRACT

An improved method of producing a rotary dispersion member comprises providing a frusto-conical from (23) with a cylindrical base (25), operating a cutting wheel (27) to cut a groove (28) in the from (23) by moving the cutter along a line (29) parallel to the side of the frusto-conical form until the straight part of the groove is cut to full depth and then moving the cutter away from the form at 90° to its central axis (34), the end of the groove thereby being formed as arcuate, grinding away the periphery of the base (25) until the outer generated curve (32) is at the required angle to a surface normal to said axis (34), mounting the worked from on a plate (36) to produce one part of a mould tool, fitting the one part in another mould tool to define a cavity therebetween, and injecting material into the cavity. The resultant dispersion member can be formed with known teeth by spark eroding said another mould tool.

15 Claims, 5 Drawing Sheets

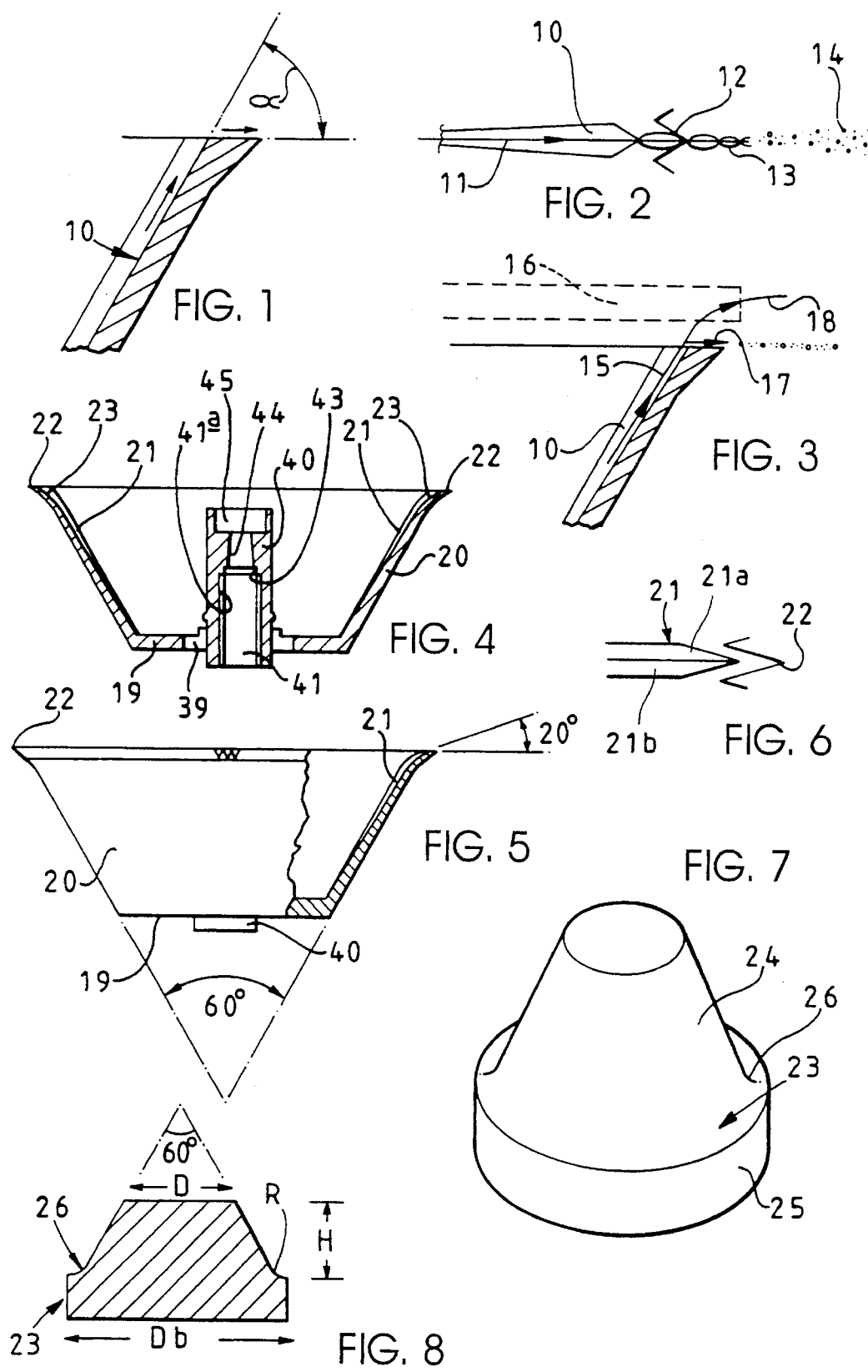

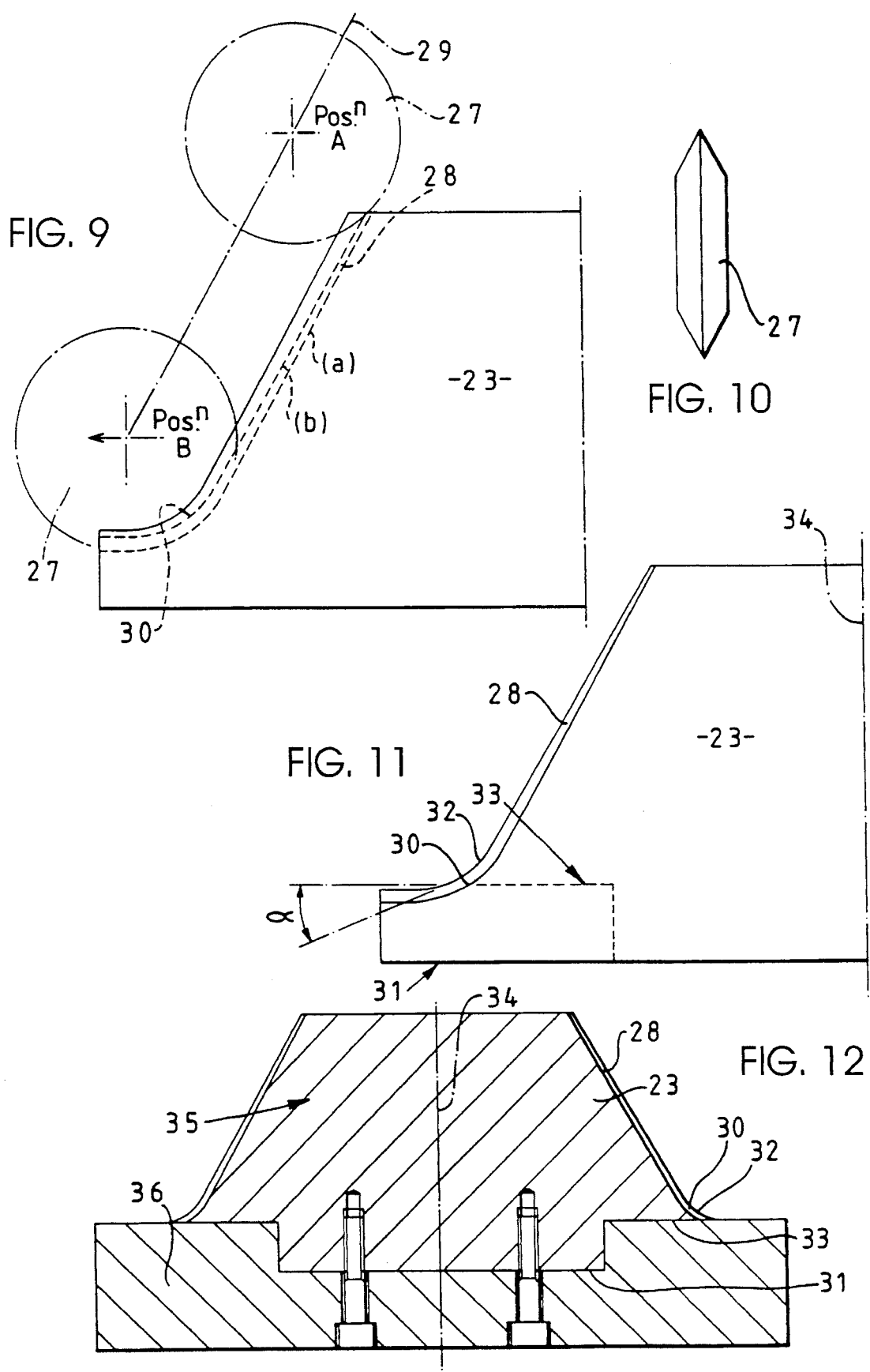

ROTARY ATOMISERS

BACKGROUND OF THE INVENTION

This invention relates to rotary atomisers of the kind which include a rotary dispersion member in the form of a hollow truncated cone having a central region with a peripheral frusto-conical wall inclined outwardly of the central region, the inner surface of the wall being formed with grooves, each of which is symmetrical and extends radially outwardly from the central region to an innermost free edge of the wall. Such a rotary dispersion member will hereinafter be referred to as being of the kind specified. An outermost edge of the wall is usually formed with radially outwardly projecting teeth, each having an apex and a root, the teeth being disposed at the same angular spacing as the grooves and aligned along a radius of the dispersion member, so that an apex of each tooth is in alignment with a base of a corresponding groove.

Rotary atomisers have been used successfully for some years as a way of atomising liquids where it is necessary to control the range of spray droplet sizes produced for greater accuracy in liquid application and/or to reduce the volumes of spray liquid required. Such applications are the atomisation of pesticides (including herbicides) in agriculture, horticulture, and amenity situations, the atomisation of water for humidification/dust suppression and the accurate application of special additives in various applications such as paper making.

Rotary atomisers consist typically of a rotating dispersion member which maybe of a simple flat disc form. The rotary member can be driven by an suitable means such as an air or hydraulic motor, electric motor (A.C. or D.C.), either directly or indirectly via gears or belts and pulleys, a propeller in an air stream, or a turbine. The speed of the rotating member can be in the range 0–100,00 r.p.m. The liquid to be atomised is then fed through a flow calibration orifice onto the rotating disc. The liquid travels to the edge of the disc and centrifuged from it as discrete droplets (either directly or from the break-up of liquid ligaments formed at the disc edge).

One problem with these basic simple forms is that if the edge of the disc is plain, the surface tension of the liquid is sufficient to prevent the liquid leaving the edge in anything other than the random break up of a sheet of liquid if not at equilibrium of liquid flow rate and disc speed. The addition of tooth-like pointed serrations acting as zero issuing point as described in a paper by Bals. 'Design of rotary atomisers' (Proc. 4th Int. Agric. Aviat. Congr., Kingston 1969) overcomes this problem. A second problem is one of feeding the spray liquid onto the disc. Ideally the feed should be at the centre of the disc where the angular velocity is at its lowest. As in practice this is normally where the drive shaft is, the feed is normally at some radius from the centre, usually resulting in poor spreading and distribution of the liquid to the disc edge. This problem has been overcome on later practical rotary atomiser designs by pointing the liquid feed towards the centre of the disc and turning the edge of the disc up to make a 'frusto-conical' form. In order to ensure that liquid is fed to each tooth as regularly as possible, channels or grooves are added to the inside of the frusto-conical form. The number of teeth is normally the same as the number of grooves and can vary from 2 to 720 or whatever is practical for the disc size which can be from say a few millimetres to 1,000 mm. The design of this type of disc (frusto-conical with teeth and grooves) is described in U.K. Patent No. 1515511.

Whilst these discs made significant advances in controlling rotary atomiser droplet production, observation showed that on early designs when the liquid reached the end of the groove, because it had to turn a corner and cross a plain section of disc to reach the tooth tip, it could be disturbed by air movement caused by rotational speed and hence the stream of liquid was sometimes split and when it rejoined it as 'corkscrewing' with subsequent deterioration of droplet spectrum. This phenomenon is illustrated in FIGS. 1 and 2 which show a groove 10, angle $\alpha$ through which liquid has to turn, liquid path 11, tooth 12 and liquid corkscrews 13 giving droplets 14.

This is overcome as described in U.K. Patent No. 2026904, which shows the interlocking of teeth and grooves and hence the shortening of the path from the end of groove to the tooth tip. In another invention as described in U.K. Patent No. 2004204 an attempt was made to ensure liquid contact from groove to tooth by means of an asymmetric tooth form. This however, suffers from the problem that it is a uni-directional rotary atomiser.

In recent years in the area where rotary atomisers are used there has been a move towards higher feed rates onto discs. This has resulted in another problem as illustrated in FIG. 3, which shows a groove 10, a liquid path 15 therein, and a body 16 of the atomiser. As can be seen, only part 17 of the stream of liquid remains in contact with the disc at the point where it leaves the groove and turns through the angle to reach the tooth tip. Another part 18 of the liquid stream splits off and emerges directly from the groove possibly resulting in contamination of the atomiser body and consequent dripping of spray liquid.

SUMMARY OF THE INVENTION

An object of the invention is to provide a method of producing an improved rotary dispersion member of the kind specified, which improved member in one embodiment overcomes or at least reduces the problems of the prior rotary dispersion members referred to.

According to the invention there is provided a method of producing a rotary dispersion member of the kind specified in which the respective ends of the grooves at said free edge are arcuate and the remainders of the grooves respectively are straight, extending from the narrower end of the truncated cone, the method comprising the steps of providing a form having at least part of its external shape as a truncated cone having a frusto-conical side surface, providing one or more cutters each with a cutting face corresponding to an inclined angle required as the angle of at least part of each groove of the rotary dispersion member, cutting at least part of said straight part of a groove in the form by moving one or more of said cutters along a line or lines parallel to said frusto-conical side surface, and moving one or more of said cutters at a side of said line or lines remote from said form to cut at least part of said arcuate part of the groove in the form if not cut during cutter movement along said line or lines, the cut straight and arcuate parts of the groove meeting to form a continuous radial groove, carrying out said cutting processes to provide a further such continuous radial groove angularly spaced from said one groove around the exterior of the form by a distance corresponding to the required width of a groove in the rotary dispersion member, said grooved form constituting one part of a mould tool, providing another part of said mould tool in the form of a cavity part, placing said mould parts together and moulding said rotary dispersion member therebetween, with said respective ends of the grooves thereof being arcuate at said free edge. rotary dispersion member of the kind specified in which the respective ends of the grooves at said free edge are arcuate, the method comprising the steps of providing a form having at least part of its external shape as a truncated cone having a frusto-conical side surface, providing a cutter with a cutting face corresponding to the inclined angle required as the angle of a groove of the rotary dispersion member, cutting at least one part of a groove in the form by moving the cutter along a line parallel to said frusto-conical side surface between the narrower end of the truncated cone form and a position spaced therefrom said one part of the groove being straight, and before or after cutting at least said straight part of the groove moving the cutter to or from said position at a side of said line remote from said form to cut the whole or part of another part of the groove if it is not cut or is partly cut during cutter movement along said line, said another part of the groove being arcuate and joined to said one part to form a continuous radial groove, repeating said cutting process to provide a further such continuous radial groove angularly spaced from said one groove around the exterior of the form by a distance corresponding to the required width of a groove in the rotary dispersion member, said grooved form constituting one part of a mould tool, providing another part of said mould tool in the form of a cavity part, placing said mould parts together and moulding said rotary dispersion member therebetween, with said respective ends of the grooves thereof being arcuate at said free edge.

Preferably the form has a radial outwardly extending part at the wider end of its truncated cone, said method including the step of removing material from the wider end of the form around the whole of at least its periphery until the end of the outer generated surface of the arcuate part of each groove is at the required angle to a surface normal to a central axis of rotation of the form, said form then constituting said one part of the mould tool.

Desirably said position is that at which the end of the straight part of a groove is cut to full depth, said movement of the cutter at said side of said line completing the cutting of said arcuate part of the groove, all or substantially all of said arcuate part being in said extension part of the form.

The invention also relates to a rotary dispersion member produced by the method of the invention.

The invention will now be described, by way of example, with reference to the accompanying drawings, in which:

BRIEF DESCRIPTION OF DRAWINGS

FIGS. 1 and 2 are scrap view of a groove and tooth of a rotary atomiser disc, showing one problem of prior art constructions;

FIG. 3 is a further scrap view of a groove and tooth of a rotary atomiser disc, showing another problem of prior art constructions;

FIGS. 4 to 6 show a sectional side view, a part-sectional side view and a scrap top view respectively of a rotary dispersion member of the invention;

FIGS. 7 and 8 are a perspective view and a reduced scale sectional side view respectively of a form for making a mould tool part for producing a rotary dispersion member of the invention;

FIG. 9 diagrammatically shows the cutting of the form in the method of the invention;

FIG. 10 is a side view of a cutter used in the method;

FIG. 11 shows the cut form and how a part thereof is cut away during the method of producing the mould tool part;

FIG. 12 shows the completed form mounted on a plate, the assembly forming a mould tool part;

DESCRIPTION OF PREFERRED EMBODIMENTS

Figure 13:
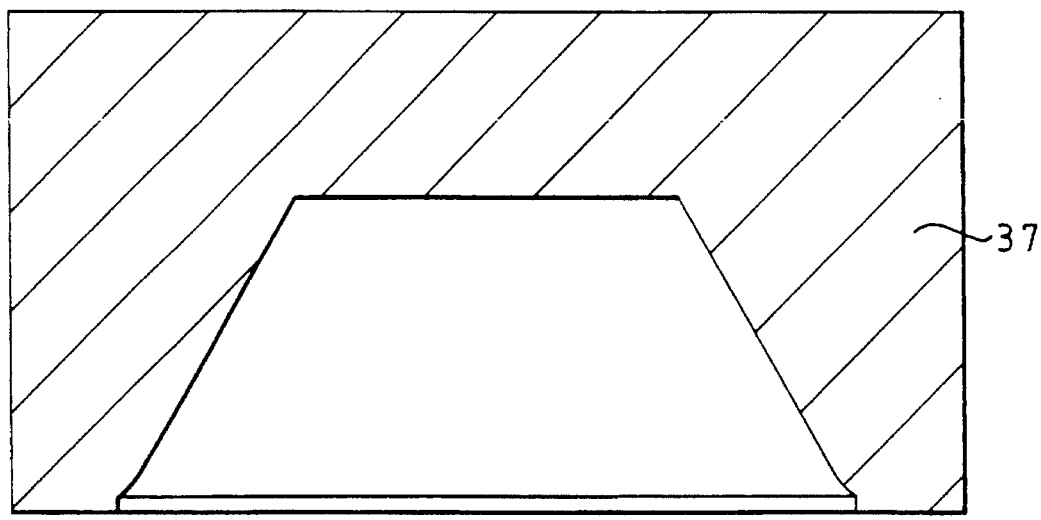
FIG. 13 shows another part of the mould tool.

The following description relates to the preferred production of a rotary atomiser in which a symmetrical (and hence bi-directional) interlocking tooth and groove form is present and where the transition from groove end to plane of tooth tip is gradual.

FIGS. 4 to 6 show such a design of rotary dispersion member or disc of a rotary atomiser. The disc is in the form of a hollow truncated cone having a central flat region 19 with a peripheral frusto-conical wall 20 inclined outwardly of region 19. The inner surface of the wall has a number of grooves 21, each being symmetrical, each extending to an outer rim of the disc and each having opposite faces 21a, 21b defining a groove angle therebetween as seen, for example, in FIG. 6. An outer edge of the rim has teeth 22 radially aligned and interlocking with the grooved respectively (FIG. 6). The upper end of each groove is arcuated as at 23 so that its junction with the rim is gradual. This particular design has a disc of 53 mm diameter, tooth tip to tooth tip, with 180 teeth and grooves, a frusto-conical form with an included angle of 60° and the groove ends overlapping the tooth bases by 0.55 mm. The end of the groove is cured with the liquid exit angle from the groove reduced to 20°. The depth of the disc overall is 20 mm.

The design of such a disc is to a large extent governed by the application in which it is to be used. Considering, for example, a portable battery powered crop sprayer, the disc drive is usually directly from a small permanent magnet d.c. motor, the size of which is determined by the life in hours required and at the disc r.p.m. needed to produce the correct droplet size whilst using minimal power from the batteries all at minimal motor cost. The motor size together with the nozzle size needed for the required flow thus determines the disc size. Whilst a disc driven from its closed side being as small as 10 mm could be envisaged, its capacity for atomisation would be so small as to greatly restrict its application. Conversely very large discs, for example up to 1000 mm diameter, could be used provided there was sufficient power to drive them. The number of teeth and grooves can be as small as 2 or as great as is practical for the size of disc. The depth of the disc can be varied, although a very shallow disc will not allow the liquid to distribute into the grooves properly and an extremely deep disc will put undue load on motor bearings.

The liquid exit angle can, as previously described, be the same as the angle of inclination of the side of the disc or as shallow as 0°. The angle of inclination of disc frusto-conical surface can of course be anything between 90° and 180°. However 90° means there is theoretically no chance of liquid escaping from the disc unless it is full and 180° again means there is poor distribution of the liquid onto the disc surface. The example shown has an included groove angle of 60°, but this could be as little as 15° on very small discs, or as big as 90° on large ones. Acute angle however, may cause groove blockage with powders and large angles may not retain the liquid in the groove, resulting, respectively, in poor distribution of the liquid in the groove or poor distribution of the liquid around the disc periphery as previously mentioned. The FIG. 4 disc could have a tooth length of 1.5 mm, but this could be varied to give either longer, although weaker, teeth with the added drawback of a long path from groove to tooth, or shortened to almost the groove end diameter which reduced the "zero issuing point" feature.

Whilst it is a relatively simple matter to draw a sketch of this ideal 'rotary atomiser disc', in reality an accurate detailed, dimensioned drawing must be made of the design before it can be manufactured. Doubtless a disc could be simply drawn which would allow one skilled in the art of model making to hand craft such a disc. However, such a disc as that previously described needs to be accurately manufactured in large quantities and at low cost which means manufacture by the process of plastic injection mouldings using materials such as acetal as the only practical means of achieving this.

Therefore, it is essential that the design of such a disc embodies a means by which a tool can be produced for the purpose of plastic injection moulding the disc. Such a method is now described, and forms one aspect of the present invention.

the method of manufacturing the mould tools consists of the following steps:

1) Produce a solid form 23 as shown in FIGS. 7 and 8, having an upper frusto-conical part 24 and a lower cylindrical part 25 extending radially therefrom. The junction on the part 25 is radiussed at 26. For a disc such as that in FIG. 4 the included conical angle of the form would be 60°, the diameter 'D' would be 28 mm, the height 'H' 18 mm, the radius 'R' 5.5 mm and the base diameter 'Db' 55 mm. The material of the form would preferably be a high quality, fine grained toolmaking steel suitable for machining to a high quality finish, hardening, tempering and polishing.

2) Using a cutting wheel 27 (FIGS. 9 and 10) of a suitable diameter, in the case of the example in FIG. 4 this is 13.0 mm and with an included angle equivalent to that required as the groove angle, in this case 60°, cut a groove 28 in the solid form 23 by moving the cutter along a line 29, parallel to the included side of the frusto-conical form from A until position B is reached where the cutter is moved away from the form at 90° to the longitudinal axis of form 23. The dotted line (a) shows the path of the tip of the cutter which, as a moulding, is the top of the groove. Line (b) shows how the outer profile is modified by the action of the cutter sides intersecting to form what becomes the bottom of the groove. Position B is that where the end of the straight part of the groove is cut to full depth, the cutter in this example also cutting substantially of the arcuate part 30 of the groove when at position B. By indexing the form by the appropriate number of degrees, it is possible to form a series of grooves around the circumference of the frusto-conical form. In the example shown the number and spacing of the grooves are such that they intersect, as mentioned above. The cutting directions can of course be altered along the paths shown and cutting can be in two stages.

3) Turn and grind back end surface 31 shown in FIG. 11 until the outer generated curve 32 is at the required angle ($\alpha$) to a surface 33 normal to the form's axis of rotation denoted by numeral 34. The grinding back (i.e. removal of material) can be radial or axial relative to line 34 or a combination thereof.

4) Mount the form 35 produced in this way on a plate 36 to form part of a mould tool (FIG. 12). The degree of grinding away in the radial direction in FIG. 11 is to allow location of the form of the plate, as shown.

5) The cavity of the tool is cut to the form 37 shown in FIG. 13 to constitute the other part of the mould tool. The part 36 is intended to fit in part 37 with clearance defining the dispersion member thickness.

6) The tooth form 38 of the dispersion member is then spark eroded into the corner of part 37 around its periphery (FIG. 14).

7) The two mould tool parts 35, 37 are then fitted together as shown in FIG. 141*a* and a suitable plastics material, such as acetal, is injected into the cavity defined between the two parts 35, 37. The resultant rotary dispersion member of FIGS. 4 to 6 overcomes the aforementioned problems of prior art atomiser discs in that in particular the arcuate, the thus gradual transition part 30 of the groove provides for better transfer of liquid from the grooves to the teeth.

This mould tool can also incorporate other features needed on the disc such as drain holes 39 (FIG. 4), which prevent flooding of the motor should the liquid be turned on whilst the motor is not working. The mould tool also forms a central column 40 (FIG. 4) of the member for securing it to the motor shaft. These other features are not shown in FIGS. 7 to 14 for clarity.

In the design of disc it is reasonable to start with a known diameter for the end of the grooves and a known number of teeth and grooves. For the sake of simplicity, start with the liquid exit angle $\alpha=0$. From this, the radial pitch of the grooves ends is calculated. With $\alpha=0$ the groove end diameter is the same as the diameter at which the cutter finishes. The cutter profile can then be chosen to give the groove profile, the preferred profile being triangular. The angle of the cutter profile determines how deep or shallow the intersection of the sides is. The diameter of the cutter can then be chosen. If it has not already been decided, the angle of the frusto-conical form can be chosen. By taking sections through the wheel it is then possible to plot the curve of the intersecting sides, i.e. at a known diameter the pitch can be calculated. Knowing the angle of the cutter and by simple trigonometry the depth can be calculated. The angle $\alpha$ can then be chosen.

It is clear that the groove shape does not vary with cutter depth and that provided the starting form is large enough the sides of the grooves will always intersect. There will be a point where if the cutter wheel moves out radially then the sides will not intersect, but all the time it moves inwards from its starting point then the sides will intersect.

As shown for the manufactured disc in FIG. 4, the column 40 has a threaded, tapered hole 41. This is used in conjunction with a threaded screw 42 (FIG. 15).

In detail, the hole 41 in column has an internal screw-thread 41*a* extending inwardly from its outer end adjacent the region 19 to a step 43 leading to a tapered section 44 which opens out into a larger diameter, hollow cylindrical inner end part 45. The screw 42 has a manually graspable head 46 from which extends an integral shank with an external screw-thread 47 complementary to thread 41a. The outer end of the shank is externally tapered at 48 to match the taper of section 44, is split lengthwise, one splint being shown at 49, and has an axial blind hole 50 therein extending from its outer end.

Figure 16:
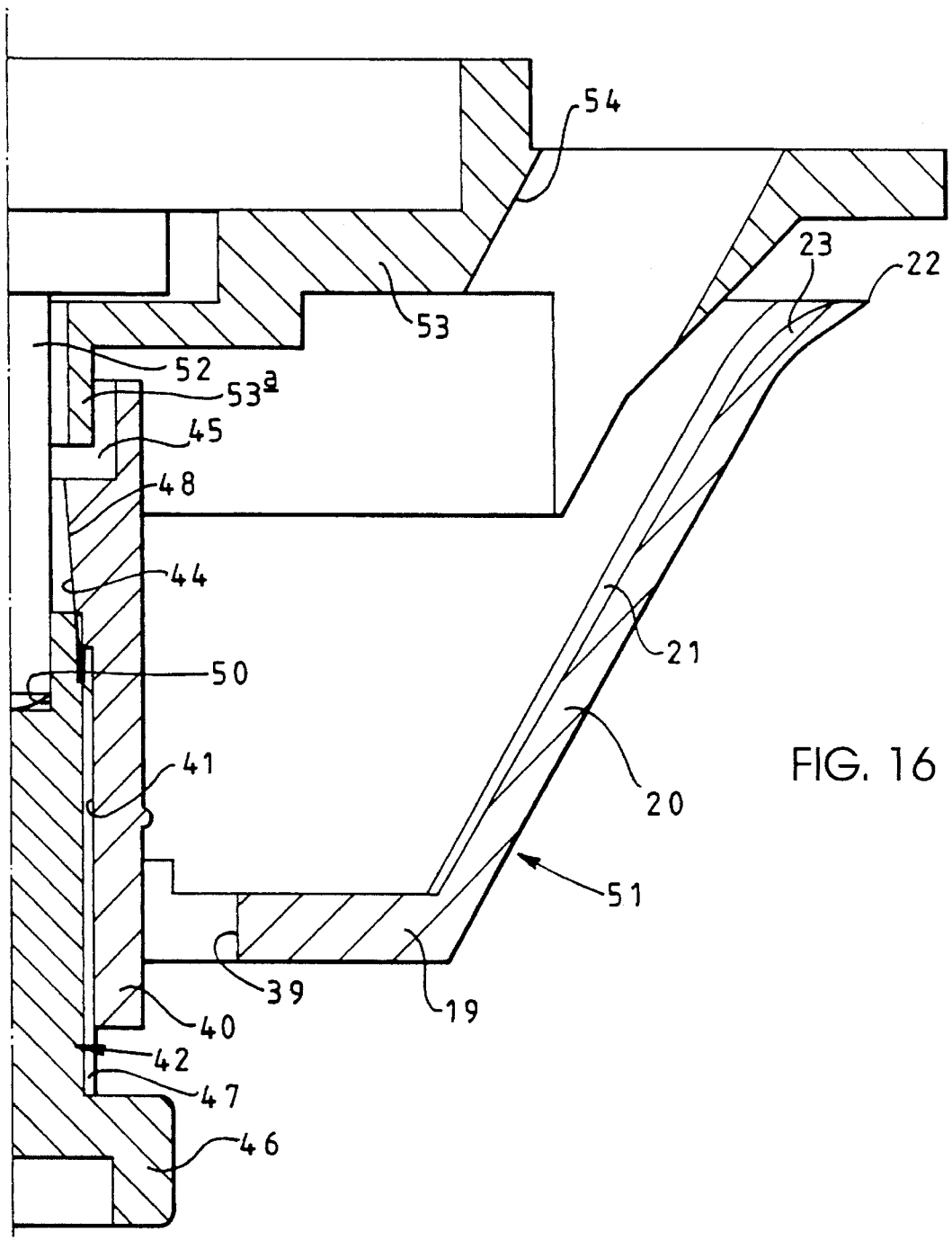
FIG. 16 shows on a enlarged scale a half section of the rotary atomiser.

In operation, with reference to FIG. 16, the screw 42 is fitted loosely into the hole 41 of column 40 the moulded disc 51, and the assembly of screw and disc is fitted to the motor shaft 52 until the end of the shaft abuts the end of the hole 50 in the screw. Then by lightly holding the disc 51 to prevent it turning, the screw 42 is wound in engaging on thread 41a until the mating surfaces of the tapered hole 44 in the disc 51 and split tapered end 48 of the screw touch. The action then is that of a collet, in that the screw grips the shaft. A depending annular flange 53a of a motor housing 53 around the shaft 52 is received in hollow end part 45. However, in addition, further tightening of the screw moves the disc away from the motor housing 53, thus ensuring a running clearance even when assembled by inexperienced hands. The disc is also balanced and centred on the shaft by this fixing. Another major advantage of such a disc mounting system is that the disc can easily be removed without the need for tools. An opening 54 in the housing 53 is for passage of a liquid feed nozzle to supply liquid to be atomised into the disc 51.

The radial extension part 25 of form 23 can be omitted and the exterior surface of the form can be merely frusto-conical. Moreover where an extension part is provided at the wider end of the frusto-conical part a radiussed junction part, such as that at 26, could be replaced by a straight part at an angle of 90° or less to axis 34. Clearly the material removal step could be omitted if there is no extension part 25 and the required angle α between the end of curve 32 and line 33 is formed in the cutting process. The cutting process at said side of line 29 remote from the form could be such that the cutter moves linearly or arcuately or in any other suitable path between position B and a position clear of the form. More than one cutter, with an appropriate cutting face to produce the required groove internal angle, could be used to cut each groove, i.e. the straight part and also the arcuate part could each be cut by a number of different cutters. Different cutters, e.g. of different diameters, could move along different parallel lines relative to the frusto-conical side surface of the form. The cutting operation need not cut all the straight part and then the arcuate part or vice versa, but could cut one or more portions of the straight part, then one or more portions of the arcuate part, or vice versa and so on.

Figure 14:
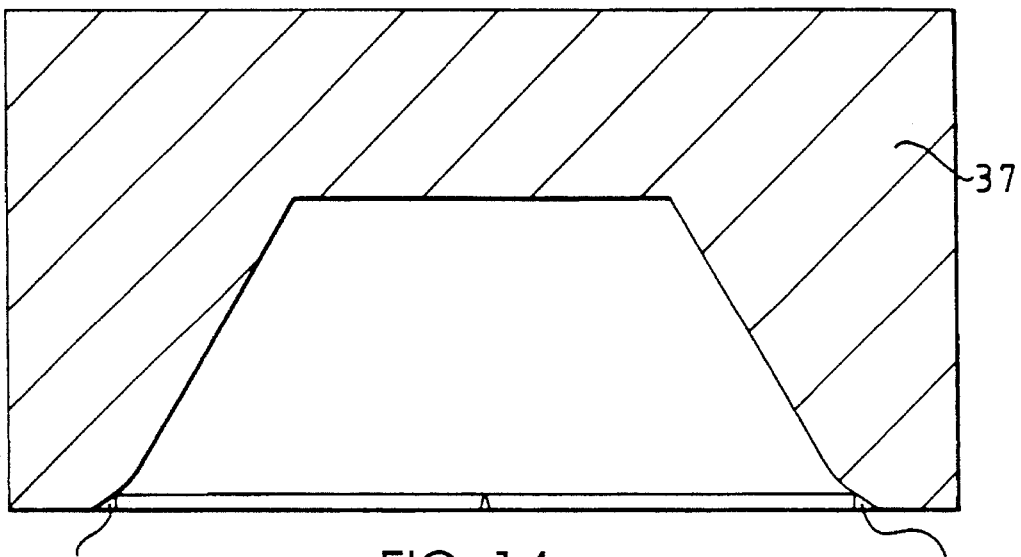
FIG. 14 shows the mould tool part of FIG. 13 after it has been adapted to provide the required tooth form on the finally moulded rotary dispersion member.
Figure 15:
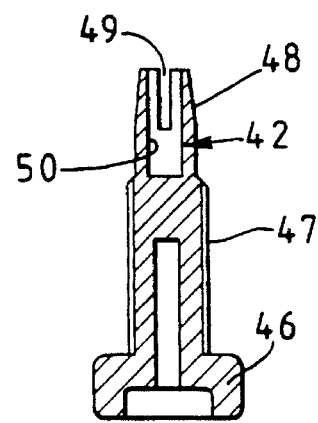
FIG. 15 is a sectional side view of a screw for securing the rotary dispersion member to a shaft of a motor of a rotary dispersion member to a shaft of a motor of a rotary atomiser.
Figure 14A:
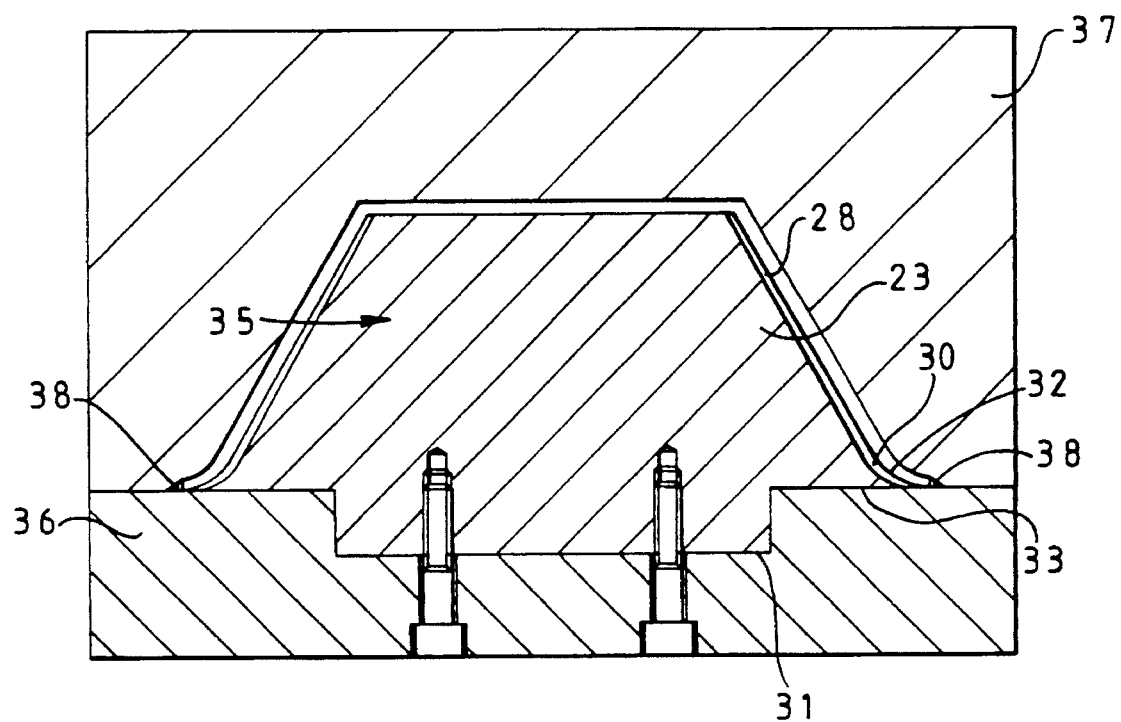
FIG. 14a shows the components illustrated in FIG. 12 and FIG. 14 assembled together to form a mould.

Although as described, the rotary dispersion member has teeth at the outermost edge of the frusto-conical wall, such teeth can be omitted where the dispersion member is to be used for a purpose where the advantages of providing teeth are not necessary. Accordingly the spark erosion process described in relation to FIG. 14 is not performed. Otherwise all other possible steps and variations of the method of the invention apply.

We claim:

1. A method of producing a rotary dispersion member in the form of a hollow truncated cone having a central region and a peripheral frustoconical wall inclined outwardly from the central region, the wall having an inner surface and an innermost free edge, grooves formed in said inner surface of the wall, each groove having a required width, having opposite faces defining a groove angle therebetween, being symmetrical and extending radially outwardly from the central region to the innermost free edge of the wall, the grooves having respective end parts at said innermost free edge of the wall, the respective end parts of the grooves being arcuate and the grooves having respective straight parts extending from said central region to the respective end parts, the method comprising the steps of providing a form having at least in part an external shape in the form of a truncated cone having a frustoconical side surface, providing a cutter having a cutting face corresponding to the groove angle of each of said grooves of the rotary dispersion member, cutting a first groove in the form using the cutter, said cutting including a step of moving said cutter along a line parallel to said frustoconical side surface, to cut at least a part of a straight part of the first groove in the form, repeating said cutting to provide a further groove in the form angularly spaced from said first groove around the frustoconical side surface of the form by a distance corresponding to a required groove spacing in the rotary dispersion member, removing material from a wider end of said form around the whole of its periphery until an end of an outer generated surface of the arcuate end part of each groove is at a required angle to a surface normal to a central axis of rotation of the form, said form then constituting one part of a mould tool, providing another part of said mould tool in the form of a cavity part, placing said mould tool parts together and moulding said rotary dispersion member therebetween, with said respective end parts of the grooves thereof being arcuate at said innermost free edge of the frustoconical wall.

2. A method as claimed in claim 1, wherein said movement of said cutter along a line parallel to said frustoconical side surface cuts the whole of said straight part of the first groove in the form.

3. A method as claimed in claim 2, wherein said movement of said cutter also cuts substantially the whole of said arcuate end part of the first groove in the form.

4. A method as claimed in claim 1, wherein said moving of said cutter is carried out to a position at which one end of the straight part of the groove is cut to full depth, and substantially all of said arcuate end part of the groove is in said radially outwardly extending part of the form.

5. A method as claimed in claim 1 which includes producing tooth forms in said cavity part to provide the rotary dispersion member with radially outwardly projecting teeth at an outermost edge of the frustoconical wall.

6. A method of producing one part of a mould tool for moulding a rotary dispersion member in the form of a hollow truncated cone having a central region and a peripheral frustoconical wall inclined outwardly from the central region, the wall having an inner surface and an innermost free edge, grooves formed in said inner surface of the wall, each groove having a required width, having opposite faces defining a groove angle therebetween, being symmetrical and extending radially outwardly from the central region to the innermost free edge of the wall, the grooves having respective end parts at said innermost free edge of the wall, the respective end parts of the grooves being arcuate and the grooves having respective straight parts extending from said central region to the respective end parts, the method comprising the steps of providing a form having at least in part an external shape in the form of a truncated cone having a frustoconical side surface, providing a cutter having a cutting face corresponding to the groove angle of each of said grooves of the rotary dispersion member, cutting a first groove in the form using the cutter, said cutting includes a step of moving the cutter along a line parallel to said frustoconical side surface between a narrower end of the truncated cone form and a position spaced therefrom, said one part of the first groove being straight, and moving the cutter to or from said position at a side of said line remote from said form, repeating said cutting to provided a further groove angularly spaced from said first groove around the frustoconical side surface of the form by a distance corresponding to a required spacing between grooves in the rotary dispersion member, and removing material from a wider end of said form around the ;whole of its periphery until an end of an outer generated surface of the arcuate end part of each groove is at a required angle to a surface normal to a central axis of rotation of the form, said form then constituting said one part of the mould tool.

7. A method as claimed in claim 6, wherein said cutting of said at least one part of the first groove in the form cuts the whole of the straight part of the first groove in the form.

8. A method as claimed in claim 6, wherein said cutting od said at least one part of the first groove in the form also cuts substantially the whole of said arcuate end part of the first groove in the form.

9. A method as claimed in claim 6, wherein said material is removed by grinding in a direction normal to said central axis.

10. A method as claimed in claim 6, wherein said position is that at which the end of the straight part of the groove is cut to full depth, said movement of the cutter at said side of said line completing the cutting of said arcuate part of the groove, substantially all of said arcuate end part being in said radially outwardly extending part.

11. A method as claimed in claim 6, wherein tooth forms are produced in said cavity part to provide the rotary dispersion member with radially outwardly projecting teeth at an outermost edge of the frustoconical wall.

12. A method as claimed in claim 11, wherein the tooth forms are produced so that each tooth as an apex and a root, the teeth being disposed at the same angular spacing as the grooves and aligned along a radius of the rotary dispersion member, so that an apex of each tooth is in alignment with a base of a corresponding groove.

13. A method as claimed in claim 8, comprising cutting said straight part of the first groove by moving the cutter along said line in a direction from a narrower end of the truncated cone form to said position spaced therefrom, and then moving the cutter away from the form in a direction normal to a central axis of rotation of the form.

14. A method as claimed in claim 13, comprising indexing the form by a selected number of degrees and repeating the cutting to form a series of grooves around the frustoconical side surface.

15. A method as claimed in claim 6, wherein after said removal of material, the form is mounted on a plate to form said one part of the mould tool.

\* \* \* \* \*